Patented July 7, 1931

1,812,923

UNITED STATES PATENT OFFICE

WILLIAM T. BRYANT, OF HOUSTON, TEXAS, ASSIGNOR TO W. A. WILLIAMS, OF HOUSTON, TEXAS

PROCESS OF REFINING OILS

No Drawing. Application filed August 30, 1927. Serial No. 216,496.

The ordinary sulphuric acid treatment and clay treatment of distillates consists in placing the distillate in an agitator and adding thereto, a suitable amount of sulphuric acid, the amount depending upon the character of the distillate to be treated. The oil and acid are thoroughly agitated by means of air, so as to cause the sulphuric acid to be thoroughly mixed with the distillate. The result of this treatment is the removal of tar and other impurities. The remaining sludge acid is drawn off together with the tar and other impurities, that settle to the bottom of the agitator. The acid oil, after the acid sludge, tar, etc., have been removed, is transferred to a clean agitator. In this agitator, the acid remaining in the oil is neutralized with a weak solution of caustic, such as sodium hydroxide or sodium carbonate. After the stock is thoroughly neutralized, the remaining alkali is removed from the stock by process of settling and washing with hot water until the distillate tests neutral to an indicator. The oil, after the alkali treat has been completed, is transferred to a large diameter, but rather a shallow tank. In this tank, any remaining water that will settle, is removed, and the small traces of water still remaining in the oil are removed by air blowing, or else by means of a vacuum, as per my co-pending application, Serial No. 153,944. The above method is the usual and generally used method of treating lubricating oils with acid, and alkali.

When the distillate is to be clay treated, two methods are commonly used. The first method consists in treating the hydrocarbons with sulphuric acid, withdrawing the acid reaction products, (eliminating the alkali treatment), adding to the treated acid hydrocarbon a decolorizing clay of approximately 200 mesh fineness, and in sufficient quantity to obtain the desired color. The clay and hydrocarbon mixture is passed through a heat exchanger, or heater coils, or other suitable heating device.

Method #2 consists of neutralizing the acid hydrocarbons with an alkali, removing the surplus alkali, and washing the oil until stock is neutral to an indicator. At this point, clay is added to the oil and the mixture is heated to a desired temperature, while passing through the heat exchanger coils, or other heating devices. In both methods, the oil is heated in the presence of clay. When operating as per Method 1 or 2, or both, the following difficulties are encountered:

In order to obtain a highly efficient transfer of heat from a heat exchanger, it is necessary to use small diameter pipes or tubing. When using small coils, considerable difficulty is encountered by plugging or stoppage, due to clay settling out of the oil, or collecting in various parts of the exchanger. Also, to obtain an efficient heat transfer, the mixture has to be passed through the coils at a relatively high velocity. The high velocity of the mixture causes a rapid depreciation of equipment, due to the cutting and abrasive action of a solid material contained in the oil. Also, if the clay and oil mixture is not kept in rapid motion, or at high velocity, the clay will settle out, thereby causing stoppage of flow. When large volumes of distillate are being prepared for clay treating, the distillate has to be kept agitated in the mixing tank, or else a settlement will occur that will in due time form a hard cake of clay which is not very easily removed.

Moreover, when the clay and oil mixture is heated, and the clay kept in contact with the oil at or above the reaction temperature, it is necessary in operating by this method, to guard against reverse action, which seems to take place. That is, a portion of a decolorizing material absorbed or otherwise held by the clay reverts back to the oil, thereby lessening the efficiency of the bleaching material.

My improved method of bleaching hydrocarbon oils consists of clay treating the distillate after acid treatment and neutralizing with caustic or other alkalis. This distillate is washed until it is neutral to indicator test.

The distillate ready for the clay is passed through a heat exchanger (designed for efficient heat transfer), and the oil is heated to the desired temperature without the presence of clay. Experiments have shown that a temperature range of 240° Fahrenheit to the flash point of the oil being heated, can be termed as my temperature limits of operation. That is, for an oil having a viscosity of 500 and a flash point of 360, my maximum temperature in this case would be approximately 350°, whereas the minimum temperature would be approximately 240°, which is governed by the type of clay that is being used.

The oil from the heat exchanger or pipe coils, passes to a mixing tank. This mixing tank contains heater coils so that the oil may be maintained at the desired temperature for the clay treat. In the mixing tank, a predetermined amount of clay is added to the oil, while the oil is being agitated. Any mechanical means of agitation can be used, but I prefer to agitate the oil after clay has been added, by means of pumping from the bottom of the mixing tank into the top of the tank, above the liquid level.

I prefer to use a decolorizing clay in a comparatively dry form, although clays possessing various moisture contents may be utilized. Such clays usually contain 10 to 15% of water, which is combined chemically with the clay. The addition of the clay to the oil which is heated above 212° Fahrenheit at once changes the moisture into vapor, and this I find gives a very important result.

The rapid formation of vapor from the combined water causes what in effect is an explosion, serving to disintegrate the clay into smaller particles whereby a more intimate contact of clay and oil is provided. This enables the process to be carried on with greater rapidity than has heretofore been the case.

Where the clay contains an excess of moisture, and in order to eliminate any violent reaction and the formation of undesirable quantities of steam, it is advisable to add the clay in appropriate quantities to secure the intimate contact. For example, the clay may be added in gradual amounts through the pump employed for agitating the oil in the mixing tank.

It is to be observed that the oil is heated initially without contact with the clay by its passage through the heat exchanger, and is introduced into the mixing chamber at the proper temperature for clay treatment. I have found, as previously stated, that a range of temperature from 240° Fahrenheit to 350° Fahrenheit is satisfactory for my process and by having the oil at such a temperature when it enters the mixing chamber it is only necessary that such mixing chamber be provided with heating means to sustain the oil at the proper temperature. This procedure eliminates the necessity of heating the oil up to a desired reaction temperature before admitting the clay.

It will be seen that by my process, as soon as the oil enters the agitating tank the clay may be added.

Moreover, since the oil is at the proper reaction temperature, the reaction of the clay with the oil is immediate and filtering can be at once carried on.

This is likewise an important feature, because with continuous and intermediate filtering, there is no delay in the carrying out of the process, and moreover, there is no opportunity for a reverse action of the clay with the oil, such as previously referred to. The process is rapid, simple and thorough, and overcomes the disadvantages which have heretofore been attendant upon the decolorizing of oils after chemical treatment. It will be noted in this process, that the oil and clay are only in contact for a period of time sufficient to be effective, and consequently no time is lost in either heating the oil and clay, or in heating the oil up to a temperature for contact with the clay. By having the oil at the proper temperature for decolorization, the clay immediately reacts and filtering is at once started.

Filtering is accomplished in a filter of the type wherein the deposits in the filter may be flushed or sluiced out of the chambers by a flow of water. This permits cleaning of the filter without dismantling the apparatus, and enables my process to be carried out without any of the usual incidental delays. It will therefore be understood that substantially continous filtering can be achieved with my process. This is desirable not only from the standpoint of recovering the oil from the clay as rapidly as possible to prevent reversion, but, moreover, because it assists in reducing the time of operations very materially.

The fact that a small quantiy of water may find its way with the oil, is not an obstacle, since I prefer to use a brightening process embodying a vacuum tower. The oil may be continuously conducted from the filter to the vacuum tower, and is sufficiently heated upon its entrance into the tower to cause the moisture content to rapidly separate out.

The present process improves both the quality of the oil and the quantity of the yield, and as will be understood, there will be no objectionable effect upon the apparatus. The time of operations is materially shortened, since the process is continuous.

Where previous decolorizing methods after chemical treatment have been complicated and expensive, the present method enables the oil to be clay treated upon its discharge from the heat exchanger and at once subjected to filtering.

What I claim is:

The process of treating oil which comprises subjecting the oil to acid treatment and removing the sludge, heating the oil above 212° F. and below its flash point, delivering the oil so heated to a clay treating chamber and maintaining it at elevated temperature, adding the clay to the oil while at said temperature to cause substantially instantaneous reaction of the oil and clay, agitating the mixture, immediately conducting the oil from the chamber through a continuous filtering means, and subjecting the filtered oil while in heated condition to the action of a vacuum, removing the moisture by volatilization, the temperature of the oil being sufficiently high to cause vaporization of any water contained in the oil at the particular pressure utilized.

In testimony whereof I have hereunto set my hand.

WILLIAM T. BRYANT.